US011630551B1

(12) United States Patent
Chao

(10) Patent No.: US 11,630,551 B1
(45) Date of Patent: Apr. 18, 2023

(54) SMART KEYCHAIN OR ACCESSORY DEVICES, SYSTEMS, AND METHODS

(71) Applicant: Dallen Yu Chao, Oakland, CA (US)

(72) Inventor: Dallen Yu Chao, Oakland, CA (US)

( * ) Notice: Subject to any disclaimer, the term of this patent is extended or adjusted under 35 U.S.C. 154(b) by 0 days.

(21) Appl. No.: 17/512,965

(22) Filed: Oct. 28, 2021

(51) Int. Cl.
*G06F 1/16* (2006.01)
*H04W 4/029* (2018.01)
*G06F 3/04817* (2022.01)
*G06F 3/04812* (2022.01)
*H04W 4/80* (2018.01)

(52) U.S. Cl.
CPC .......... *G06F 3/04817* (2013.01); *G06F 1/163* (2013.01); *G06F 1/1626* (2013.01); *G06F 3/04812* (2013.01); *H04W 4/029* (2018.02); *H04W 4/80* (2018.02)

(58) Field of Classification Search
CPC .... G06F 3/04817; G06F 1/1626; G06F 1/163; G06F 3/04812; H04W 4/029; H04W 4/80
See application file for complete search history.

(56) References Cited

U.S. PATENT DOCUMENTS

| | | | |
|---|---|---|---|
| 9,392,851 B2 * | 7/2016 | Lam | H04M 1/0254 |
| 10,452,224 B2 * | 10/2019 | Jang | G06F 3/0488 |
| 10,591,955 B2 * | 3/2020 | Iskander | G06F 1/163 |
| 2010/0283744 A1 * | 11/2010 | Nordenhake | G06F 3/04883 |
| | | | 345/173 |
| 2010/0295789 A1 * | 11/2010 | Shin | G06F 1/1626 |
| | | | 715/765 |
| 2014/0123183 A1 * | 5/2014 | Fujimoto | H04N 21/4316 |
| | | | 725/37 |
| 2014/0139637 A1 * | 5/2014 | Mistry | G06F 1/163 |
| | | | 348/46 |

(Continued)

FOREIGN PATENT DOCUMENTS

| | | | |
|---|---|---|---|
| EP | 2733598 A2 | 5/2014 | |
| KR | 20200135494 A * | 4/2019 | |
| WO | WO-2020227133 A1 * | 11/2020 | G06F 1/163 |

OTHER PUBLICATIONS

Customizing an app icon on your Home screen, retrieved from—https://web.archive.org/web/20161110000055/https://www.lg.com/us/mobile-phones/VS985/Userguide/068.html, Nov. 10, 2016, 1 page (Year: 2016).*

(Continued)

*Primary Examiner* — Yongjia Pan
(74) *Attorney, Agent, or Firm* — McCarter & English, LLP

(57) ABSTRACT

Smart keychain devices, systems, and methods are disclosed. An example apparatus can include a device body having a round shape with a thickness less than about 10 millimeters (mm) and a diameter less than about 80 mm. The device body can include a graphical user interface and a processing circuitry coupled to a memory. The processing circuitry can be configured to send, using a first communication connection, a first request to a computing device. The processing circuitry can be further configured to determine that a response from the computing device is absent using the first communication connection. The processing circuitry can be further configured to send, using a second (Continued)

communication connection, a second request to the computing device. The processing circuitry can be further configured to receive the response from the computing device, and establish a connection between the device and the computing device.

18 Claims, 10 Drawing Sheets

(56) References Cited

U.S. PATENT DOCUMENTS

| | | | | |
|---|---|---|---|---|
| 2014/0308930 A1* | 10/2014 | Tran | ............. | H04W 4/50 |
| | | | | 455/414.1 |
| 2015/0338888 A1* | 11/2015 | Kim | ............. | G06F 1/1643 |
| | | | | 345/156 |
| 2016/0132074 A1* | 5/2016 | Kim | ............. | G06F 1/1652 |
| | | | | 345/173 |
| 2016/0170608 A1* | 6/2016 | Zambetti | ............. | G06F 3/0236 |
| | | | | 715/810 |
| 2017/0161047 A1* | 6/2017 | Jeon | ............. | G06F 8/61 |
| 2017/0202514 A1* | 7/2017 | Nousiainen | ............. | A61B 5/389 |
| 2019/0014242 A1* | 1/2019 | Piekarski | ............. | G06F 1/1626 |
| 2020/0249632 A1* | 8/2020 | Olwal | ............. | G04B 47/063 |
| 2021/0096675 A1* | 4/2021 | Klein | ............. | G06F 3/0481 |
| 2022/0197584 A1* | 6/2022 | Zheng | ............. | G06F 3/04817 |

OTHER PUBLICATIONS

Adding application icons to the Home screen, retrieved from—https://web.archive.org/web/20161205094651/https://www.lg.com/us/mobile-phones/VS950/Userguide/basics_adding_application_icons_to_the_home_screen.html, Dec. 5, 2016, 1 page (Year: 2016).*

The One, retrieved from—https://www.imdb.com/title/tt0267804/mediaviewer/rm127849473/?ref_=ext_shr_lnk, 2001, 1 page (Year: 2001).*

Chan, Chipolo ONE Spot review: What AirTag could have been. Retrieved online at: https://www.imore.com/chipolo-one-spot-review. 13 pages, May 28, 2021.

Wikipedia, AirTag. Retrieved online at: https://en.wikipedia.org/wiki/AirTag. 6 pages, Jul. 2, 2022.

Wikipedia, Apple Watch. Retrieved online at: https://en.wikipedia.org/wiki/Apple_Watch. 18 pages, Jul. 5, 2022.

Wikipedia, List of Fitbit products. Retrieved online at: https://en.wikipedia.org/wiki/List_of_Fitbit_products. 8 pages, Jul. 2, 2022.

Wikipedia, Samsung Galaxy SmartTag. Retrieved online at: https://en.wikipedia.org/wiki/Samsung_Galaxy_SmartTag. 2 pages, Mar. 8, 2022.

Invitation to Pay Additional Fees for Application No. PCT/US2022/048159, dated Mar. 6, 2023, 10 pages.

* cited by examiner

SMART KEYCHAIN OR ACCESSORY DEVICES, SYSTEMS, AND METHODS

The present disclosure relates generally to the field of wireless devices. More specifically, the present disclosure relates to smart keychain devices, systems, and methods.

A keychain is an item people often carry with keys. The keychain may be decorative, and/or include some small tools, e.g., small flashlights, compasses, calculators, penknives, discount cards, bottle openers, and USB flash drives, to name a few. As electronic technology continues to become smaller and cheaper, electronic keychains are becoming common, such as keychains for remotely controlling functionalities on vehicles accessing to an access-controlled area, or the like.

Portable electronic devices (e.g., computers, laptops, mobile devices, wireless devices, Internet-connected computing devices, or any suitable computing devices) are becoming widely prevalent and are increasingly being used for different forms of communications with a variety of computing devices and/or with other portable electronic devices. However, communications capabilities are limited by the number of devices to be communicated and distance between the devices. Moreover, some portable electronic devices have large form factors (e.g., large size, heavy weight, or the like) and are very expensive.

Thus, smart keychain devices, systems, and methods which address the foregoing, and other, needs are desired.

The present disclosure relates to smart keychain devices, systems, and methods. A smart keychain device can include a device body having a round shape with a thickness less than about 10 millimeters (mm) (e.g., in a range of about 7 mm to about 10 mm), and a diameter less than about 80 mm (e.g., in a range of about 56 mm to about 72 mm). The device body can include a graphical user interface comprising an icon indicative of a functionality. For example, an icon represents a functionality of a device-find functionality, a transaction functionality (e.g., digital payment, digital wallet, etc.), a user entertainment functionality (e.g., music playing, audio/video file playing, etc.), a user activity tracking functionality (e.g., fitness data tracking, biometric data tracking, etc.), a voice control functionality (e.g., voice controls for other computing devices, artificial intelligence-powered virtual assistant device, smart home virtual assistant device, etc.), a user interface control functionality (e.g., selecting, adding or remove icon and icon images), or a communication functionality (e.g., phone calls, text messages etc.). The device body can further include a processing circuitry coupled to a memory, and the processing circuitry can be configured to receive a user input (e.g., a voice input, or click) indicative of a selection of the functionality. In some embodiments, the user interface (e.g., in a round shape) can present content in 360 degrees In some embodiments, the smart keychain device can perform all-way device finding. For example, the device can send, using a first communication connection (e.g., one of Bluetooth or Wi-Fi), a first request to a computing device (e.g., a lost device). The first request can a first distance range threshold (e.g., a range defined by the Bluetooth or Wi-Fi) associated with the first communication connection. The smart keychain device can determine that a response from the computing device is absent using the first communication connection. For example, a distance between the computing device and the smart keychain device is outside of the first distance range threshold. In some examples, a signal received from the computing device dissatisfies a signal threshold (e.g., the signal is too weak to be detected). In some examples, no response is received during a waiting time period that is assigned by the smart keychain device to the computing device for responding to the first request. The smart keychain device can send, using a second communication connection (e.g., one of Bluetooth, Wi-Fi, a cellular communication, and GPS-based communication, but different from the first communication connection), a second request to the computing device. The process is repeated until the smart keychain device receives the response from the computing device. The smart keychain device can establish a connection between the smart keychain device and the computing device. For example, the smart keychain device can instruct the lost device to lock, erase, how a message, play a sound, or lock the lost device itself. In some embodiments, the lost device can also find the smart keychain device.

BRIEF DESCRIPTION OF THE DRAWINGS

The foregoing features of the invention will be apparent from the following Detailed Description of the Invention, taken in connection with the accompanying drawings, in which.

DETAILED DESCRIPTION

The present disclosure relates to smart keychain devices, systems, and methods as described in detail below in connection with FIGS. 1-10.

Figure 1:
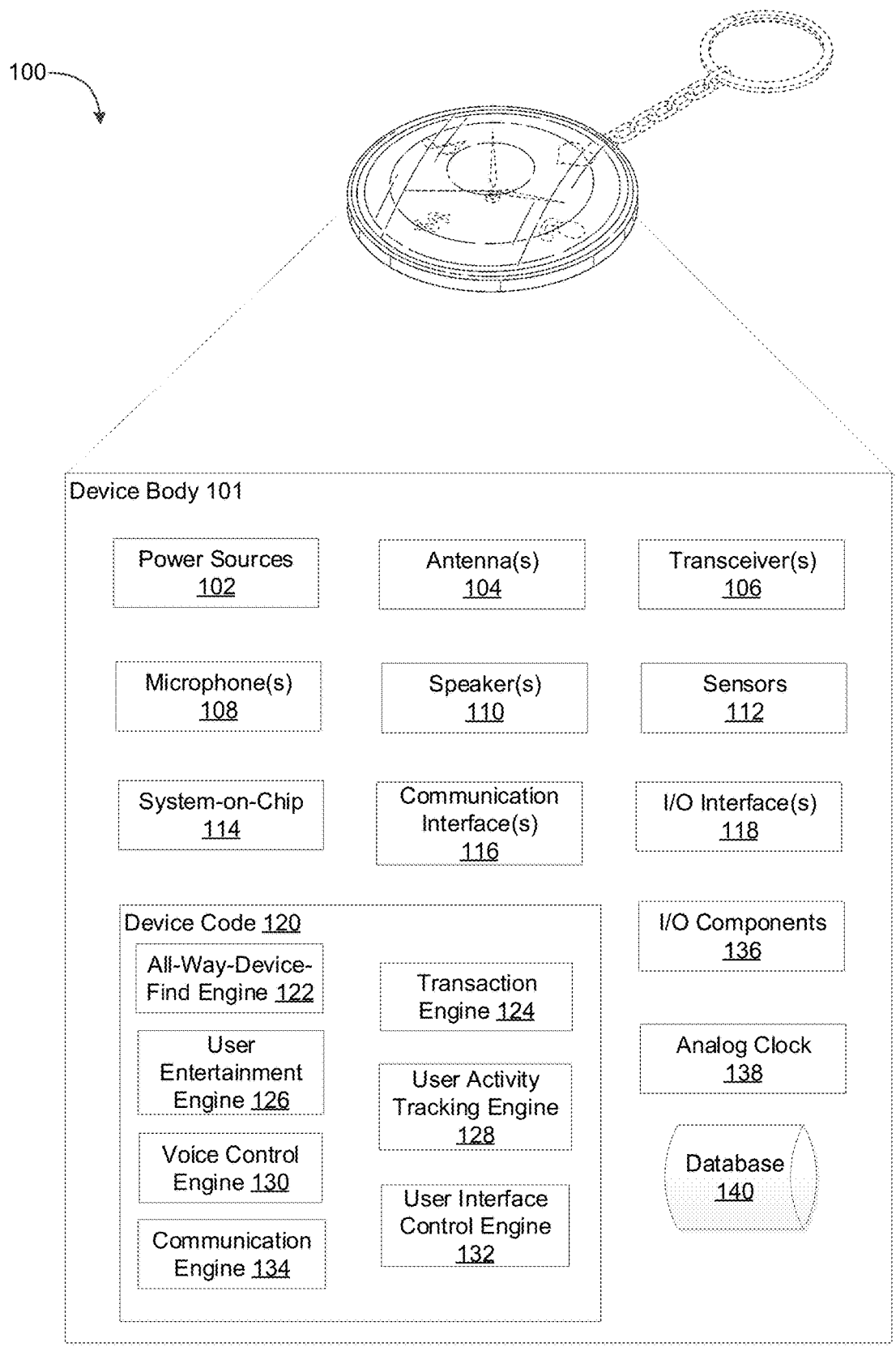
FIG. 1 is a diagram illustrating a smart keychain device of the present disclosure.

Turning to the drawings, FIG. 1 is a diagram illustrating a smart keychain device 100 of the present disclosure. The smart keychain device 100 (also refer to as device 100) includes a device body 101. The device body 101 generally includes one or more power sources 102 (e.g., to provide a power supply to the device 100 via batteries, wireless charger, or the like), one or more antennas 104 (e.g., to receive wireless signals), one or more transceivers 106 (e.g., to communicate wirelessly with other devices and sensors 112), one or more microphones 108 (e.g., to receive voice inputs), one or more speakers 110, one or more sensors 112 (e.g., temperature sensors, accelerometers, magnetometers, gyroscopes, the global position system sensors, biometric sensors, or the like), a system-on-chip 114 (e.g., processing circuitry/hardware having one or more processors), one or more communication interface(s) 116 (e.g., to allow the device 100 to communicate with one or more computing devices over a network), one or more I/O interface(s) 118 (e.g., to allow for the coupling I/O components 136 to the device 100), one or more I/O components 136 (e.g., including displays, touch sensors, audio/video I/O components, and other suitable I/O components), a device code 120, an analog clock 138, and a database 140.

The devices illustrated and described herein are referred to as "keychain" devices, but one will appreciate that the term "keychain" encompasses key fobs, pendants, or other small accessories that can be handheld and may not necessarily be attached to keys. For example, the described and claimed devices may include a pendant or key fob whether or not it has an attachment mechanism for keys.

The device code 120 (non-transitory, computer-readable instructions) is stored on a computer-readable medium and executable by the system-on-chip 114, one or more computer systems, and/or other processing hardware (e.g., processors). The device code 120 can include various custom-written software modules that carry out the steps/processes discussed herein, and can include, but is not limited to, an all-way-device-find engine 122, a transaction engine 124, a user entertainment engine 126, a user activity tracking engine 128, a voice control engine 130, a user interface control engine 132, and a communication engine 134. The device code 120 can be programmed using any suitable programming languages including, but not limited to, C, C++, C#, Java, Python, or any other suitable language. Additionally, the device code 120 can be distributed across multiple computer systems in communication with each other over a communications network, and/or stored and executed on a cloud computing platform and remotely accessed by a computer system in communication with the cloud platform. The device code 120 can communicate with the database 140, which can be stored on the same computer system as the device code 120, or on one or more other computer systems in communication with the device code 120.

A computer-readable medium may include any tangible non-transitory medium for storing information in a form readable by one or more computers, such as but not limited to read only memory (ROM), random access memory (RAM), magnetic disk storage media, optical storage media, and a non-volatile memory (e.g., electrically programmable read-only memory (EPROM), electrically erasable programmable read-only memory (EEPROM), any other suitable semiconductor memory devices, flash memory devices, internal hard disks, removable disks, magneto-optical disks, CD-ROM disks, DVD-ROM disks, or any other suitable magnetic disks).

The analog clock 136 includes one or more physical hands (e.g., a single hand, an hour hand, a minute hand, a second hand, or the like), and a movement component to move the one or more physical hands clockwise to indicate a current time.

The database 138 can include various types of data, but not limited to, one or more user inputs, one or more intermediate and final outputs from various components of the device 100, as described above. The database 138 can further include media content, such as, music files, audio files, video files or the like.

It should be understood that FIG. 1 is only one potential configuration, and the device 100 of the present disclosure can be implemented using a number of different configurations.

Figure 2:
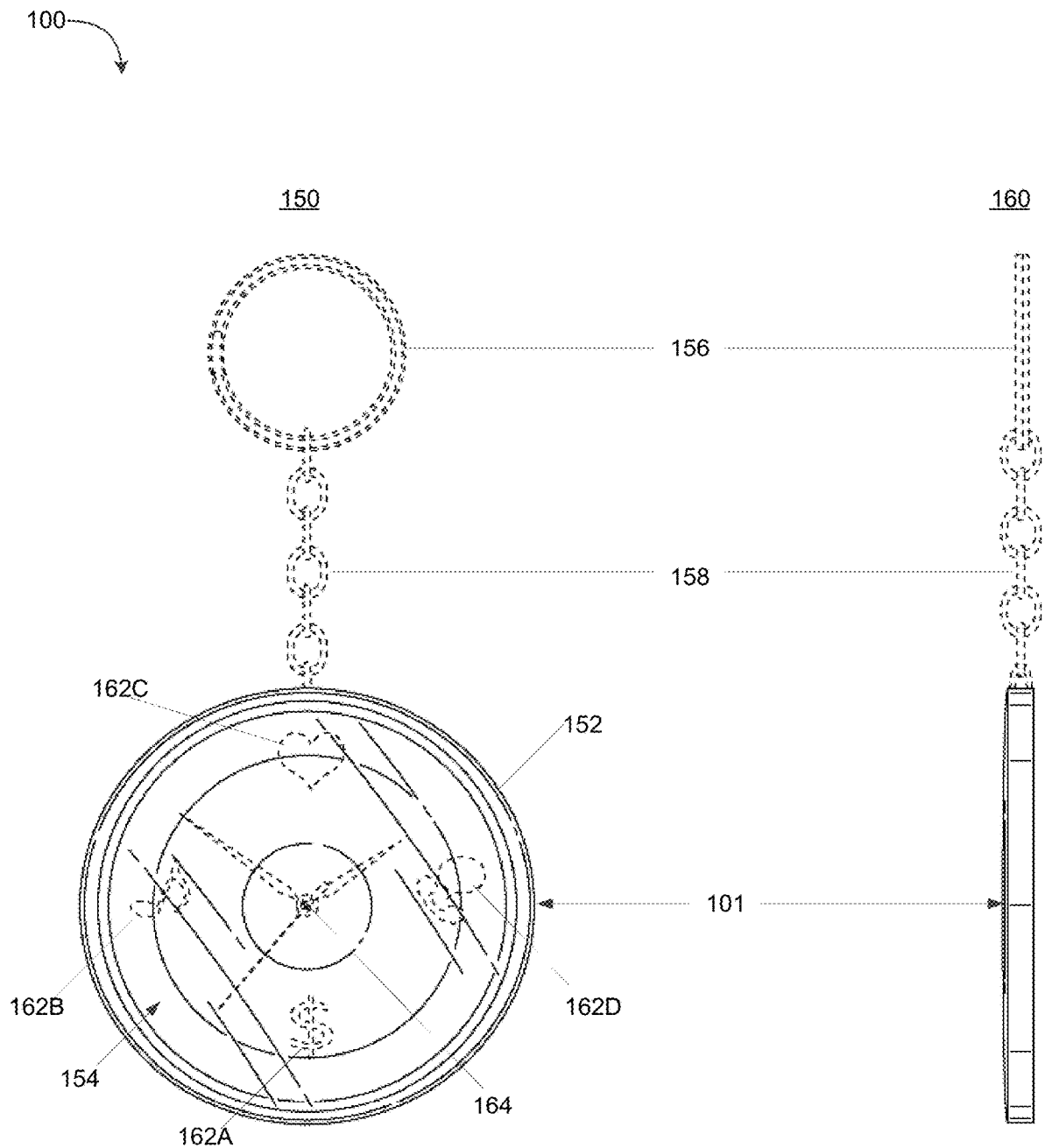
FIG. 2 is a diagram illustrating exemplary views of a smart keychain device of the present disclosure.

FIG. 2 is a diagram illustrating example views of the smart keychain device 100 of the present disclosure. FIG. 2 shows a top view 150 and a side view 160 of the device 100. The device body 101 has a round shape with a thickness that is less than commercial smart watches (e.g., Apple watch, Samsung watch, Google watch, or the like). For example, the device body 101 can have a thickness less than about 10 millimeters (mm) (e.g., about 7 mm to about 9 mm). The device body 101 can also have a diameter less than about 80 mm and/or greater than about 50 mm (e.g., about 56 mm to about 72 mm). The use of the term "about" in conjunction with a numerical value throughout the description refers to within 20% of the stated numerical value. In addition, the device body 101 can have a single layer system-on-chip 114 to reduce the weight of the device 100. In some embodiments, a user interface of the device body also has a round shape that is similar to the shape of the device body.

The form factors (e.g., the size, shape, weight, or the like) of the device body 101 can have several technical benefits. For example, the conventional devices generally rely on other devices to perform calculations and messaging, which involves reliance on a connection between devices. When a connection is poor or disconnected, calculations and responses may be delayed or may not occur. The device 100 has a reduced weight that can reduce power consumption to save power. Due to the save power, the device 100 can benefit from faster calculations and initiations of communications (e.g., sending messages, etc.) performed by the device 100 itself. In addition, the use of the single layer system-on-chip 114 allows maximizing the size of the power sources 102 for more power in the limited size of the device 100. Further, the round shape for the user interface and/or device body enables the device 100 to present content in 360 degrees regardless of how a user rotates the device 100 and attachment positions to other items (e.g., keys or devices).

As show in FIG. 2, the device body 101 includes a case 152 and a graphical user interface 154. The case 152 is connected with a ring 156 via a chain 158. The device 100 can be connected with other items via the ring 156. In some embodiments, the ring 156 and/or the chain 158 can be optional. A graphical user interface 154 is located on a surface of the case 152. The graphical user interface 154 can be configured to display content and to receive a user input (e.g., a user clicking or a voice input). The graphical user interface 154 can include a high resolution display, a touchscreen, or a liquid crystal or electrophoretic display elements. The device 100 further includes an hour hand, a minute hand, and a second hand to indicate current time. These three physical hands are spaced apart from the graphical user interface 154 and move in a clockwise direction relative to the center 164. The graphical user interface 154 and the physical hands are on the same side of the case 152 such that they are simultaneously viewable to the user. In some embodiments (not shown in FIG. 2), the device 100 can have only one physical hand to indicate the current time. Additionally and/or alternatively, the physical hands and graphical user interface can be located on different surfaces of the case. For example, the physical hands can be located on a back surface of the case, and the graphical user interface can be located on a front surface of the case. In some embodiments, the physical hands can be optional.

Figure 3:
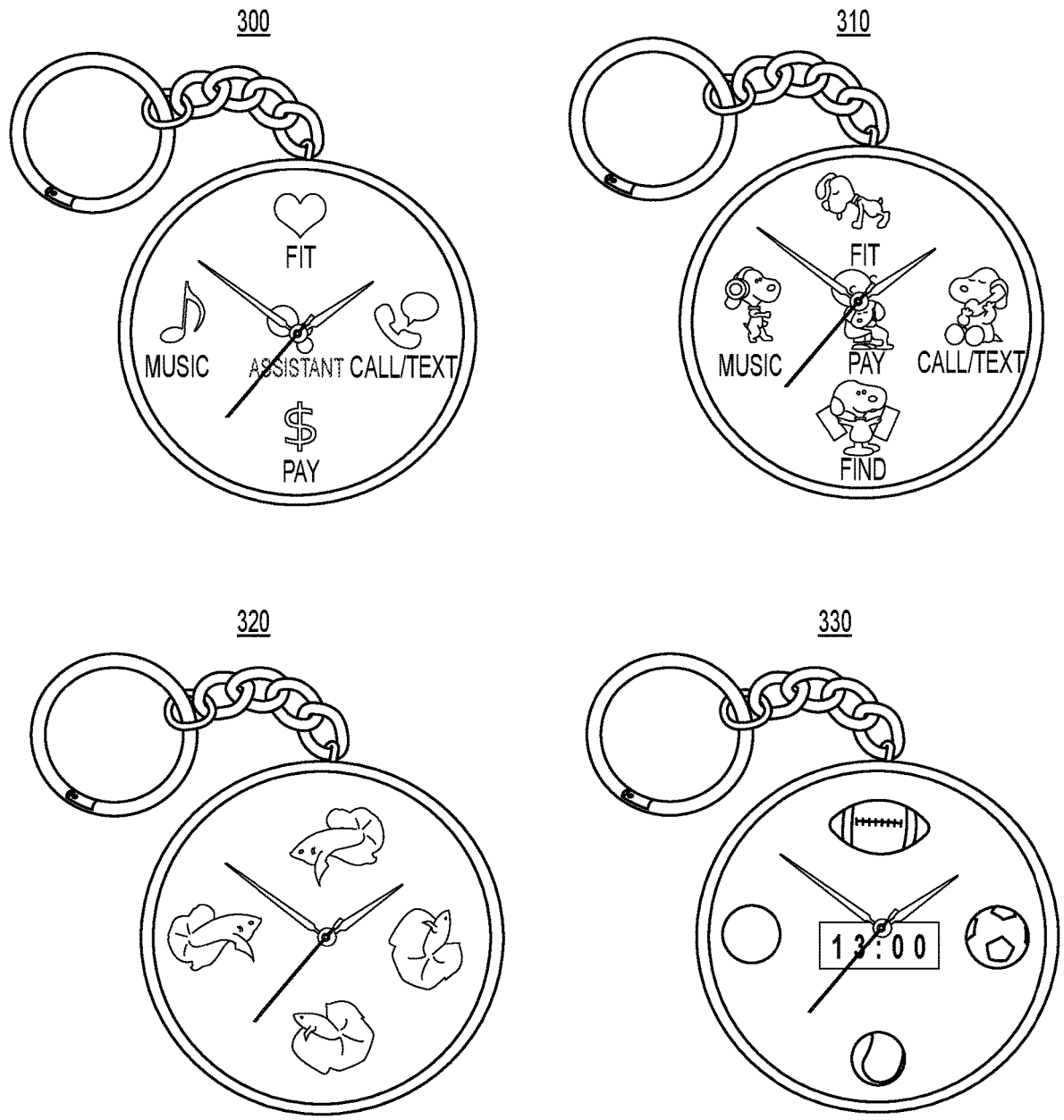
FIG. 3 is a diagram illustrating various examples of icon representations of a smart keychain device of the present disclosure.

As shown in FIG. 2, the graphical user interface 154 can display icons 162A-162D. Each icon represents a particular functionality, such as an entertainment functionality (e.g., music playing, audio/video file playing or the like), a communication functionality (e.g., phone calls, messages, communications with other computing devices, or the like), a transaction functionality (e.g., digital payment, digital wallet, or the like), a voice control functionality (e.g., voice controls for other computing devices, artificial intelligence-powered virtual assistant device, smart home virtual assistant device, or other suitable virtual assistant device), a user activity tracking functionality (e.g., fitness data tracking, biometric data tracking, or the like), a device finding functionality, or any other suitable software functionality. In some embodiments, the device 100 can select one or more functionalities to be shown in the graphical user interface 154, and select icon representations for the selected functionalities based on user inputs. In some embodiments, the device 100 can add or remove one or more icon representations. The device 100 can generate an icon having a selected icon representation for the added functionality and display the generated icon representation. For example, as shown in FIG. 3 (which is a diagram illustrating various examples of icon representations of the smart keychain device of the present disclosure), a first example 300 shows 5 icons with descriptors (e.g., music, pay, call/text, fit, and assistance). Each icon has a particular representation (e.g., a picture, and/or a text descriptor). A second example 310 shows that the assistant icon indicative of the voice control functionality is replaced with the pay icon indicative of the transaction functionality, and a find icon indicative of the device find functionality is added in to the graphical user interface. The second example 310 also shows that the icon representations of the first example 300 are replaced with a series of theme related icon representations (e.g., snoopy theme, or the like). A third example 320 and a fourth example show icons without descriptors based on user inputs. Each icon can represent a particular functionality. The third example 320 has a fish theme-related icon representations. The fourth example 330 also shows that the icon representations of the third example 300 are replaced with a series of a sport ball theme related representations, and also adds a digital clock in the center of the user interface.

Returning to FIG. 2, when a user selects an icon, a particular functionality is initiated. For example, if the user selects the icon 162A, the device 100 can initiate the transaction functionally to transfer and/or receive money from other devices. If the user selects the icon 162B, the device 100 can present a music list to a user for selection, and send the selected music to other devices (e.g., wired earbuds/headphones, wireless earbuds/headphones, etc.). If the user clicks on the icon 162C, the device 100 can present a second graphical user interface to display information about fit activity tracking of the user. In some embodiments, the device 100 can send the fit activity tracking data to other computing devices (e.g., a smart phone, a laptop) for further analysis. Similarly, if the user selects the icon 162D, the device 100 can initiate cellular phone calls and text messages between the device 100 and other computing devices. In some embodiments, one of the icons can be located at the center 164 of the graphical user interface 154, and the remaining of icons can be evenly distributed along a circumference of the graphical user interface 154. In some embodiments, all the icons can be evenly distributed along a circumference of the graphical user interface 154. In some embodiments, icons are optional. The device 100 displays no icons, as further described in FIG. 4.

Figure 4:
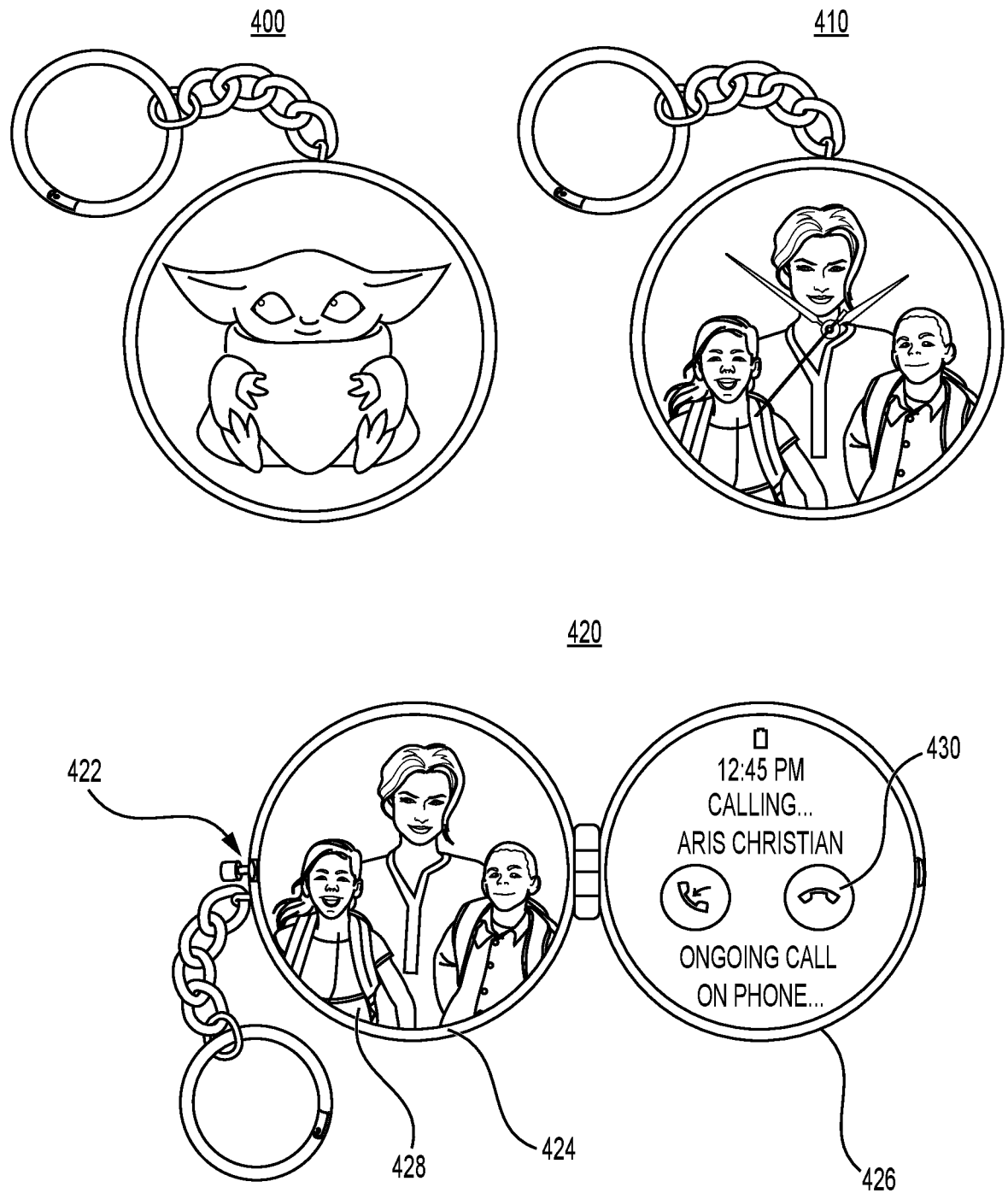
FIG. 4 is a diagram illustrating example smart keychain devices of the present disclosure.

FIG. 4 is a diagram illustrating example smart keychain devices of the present disclosure. A smart keychain device 400 (referred as to a device 400) is one of embodiments of the device 100. The device 400 does not have icons and physical hands. The device 400 automatically selects media content (e.g., an image, a video, or the like) as a background.

The device 400 can selects the background based on a user input. A smart keychain device 410 (referred as to a device 410) is one of the embodiments of device 100. The device 410 has physical bands indicative of current time, and selects a photo as a background automatically and/or manually. A smart keychain device 420 (referred as to a device 420) is one of embodiments of the device 420. The device 420 includes a case 422. The case 422 includes a first portion 424 and a second portion 426 that can be placed at a close position to form a closed enclosure indicative of the case 422 being closed or at an open position indicative of the case 422 being open. The first portion 424 includes a first graphical user interface 428 that is located at an interior surface of the first portion 424 to present an automatically and/or manually selected media content. The second portion 426 includes a second graphical user interface 430 that is located at an interior surface of the second portion 426 to present one or more functionalities via icons. For example, the first graphical user interface 424 can be one of embodiments of the graphical user interface of the devices 100, 400 and/or 410. The second graphical user interface 424 can be one of embodiments of the graphical user interface of the devices 100, 300, 310, 320, and/or 330. In some embodiments, the first graphical user interface 424 and the second graphical user interface 430 can present/display extended content. For example, some icons are displayed on the first graphical user interface 424, and the remaining icons are displayed on the second graphical user interface 430. In some embodiments, the first potion 428 can have a photo frame to insert a photo instead of the first graphical user interface 428. If the case 422 is open, the first graphical user interface 428, and the second graphical user interface 430 are viewable to a user.

In some embodiments (not shown in FIG. 4), physical hands can be located the interior surface of the first portion 424 or the second portion 426 such that the physical hands, and the first and second graphical user interfaces 428 and 430 are simultaneously viewable to the user. In some embodiments, the physical hands can be placed at an exterior surface of the first portion 424 or the second portion 426 such that the physical hands, and the first and second graphical user interfaces 428 and 430 are not simultaneously viewable to the user.

Figure 5:
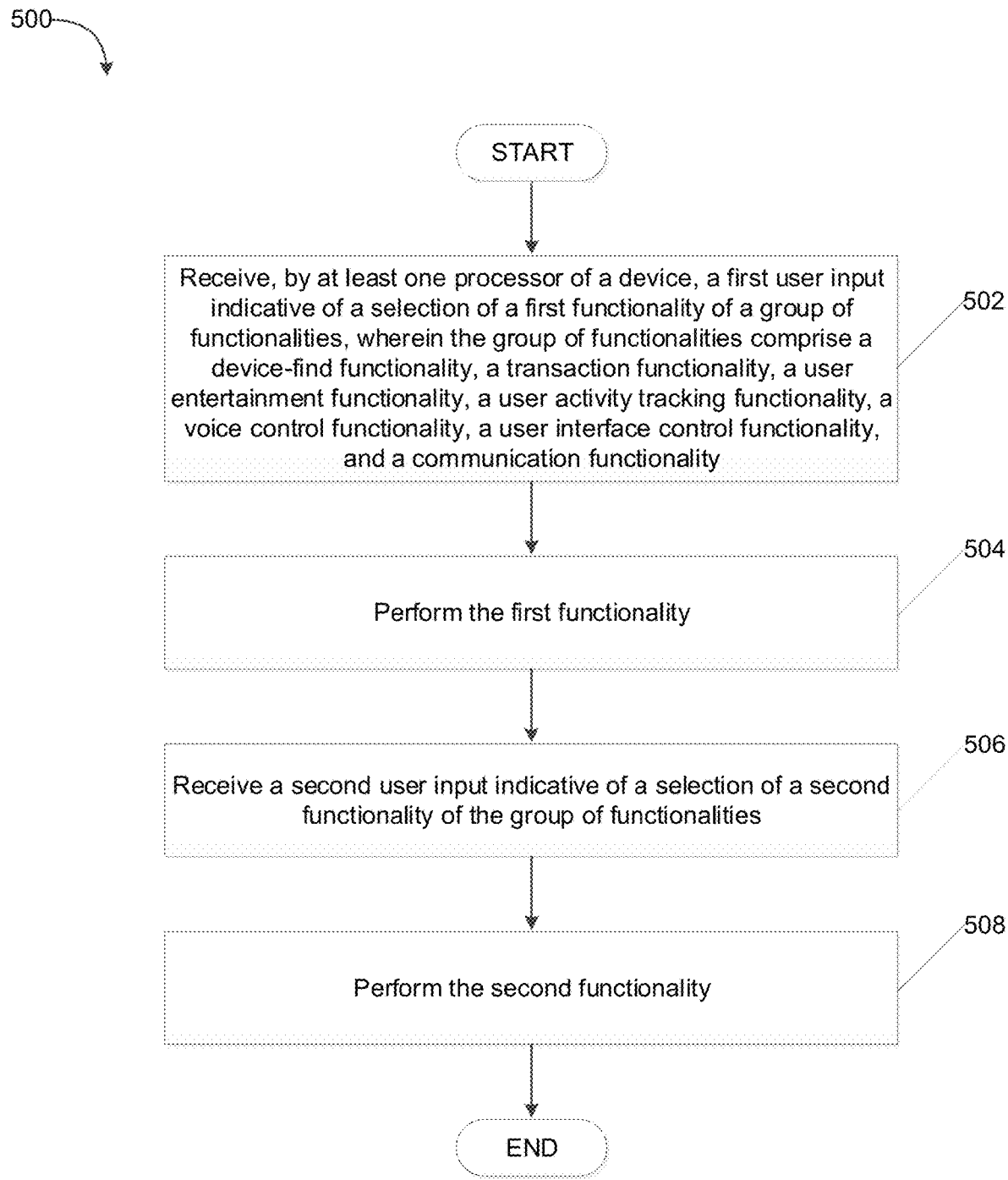
FIG. 5 is a flowchart illustrating overall processing steps carried out by a smart keychain device of the present disclosure.

FIG. 5 is a flowchart illustrating overall processing steps 500 carried out by the device 100 of the present disclosure. Beginning in step 502, the device 100 receives, by at least one processor of the device 100, a user input indicative of a selection of a first functionality of a group of functionalities. The group of functionalities include a device-find functionality, a transaction functionality, a user entertainment functionality, a user activity tracking functionality, a voice control functionality, a user interface control functionality, and a communication functionality. For example, a user can click on an icon associated with a first functionality (e.g., a device finding, a user activity tracking, a cellular phone call, a text message, a payment transaction, a music playing, a virtual assistant, or the like) on the graphical user interface of the device 100. In other examples, a user can input a voice command to the device 100 via a microphone 108 to initiate the first functionality. It should be also understood that the device 100 can perform the aforementioned task via the communication engine 134.

In step 504, the device 100 performs the first functionality. For example, if the user selects a device finding functionality, the device 100 performs the steps further described in FIG. 6. If the user selects a transaction functionality, the device 100 performs digital payment transactions to transfer an amount of money from a first account to a second account. For example, the device 100 can be linked to one or more credit/debit cards, and/or checking/saving bank accounts. The device 100 can provide contactless payments using a radio-frequency identification (RFID) or near field communication (NFC) via the antennas 104 and/or the transceivers 106 if device 100 is in close physical proximity to a payment terminal. In some embodiments, the device 100 can provide payments using a wireless communication (e.g., Wi-Fi) and/or cellular communications. In some embodiments, the device 100 can be severed as a digital wallet to receive payments and/or deposits, and save the received payment and/or deposits. It should be also understood that the device 100 can perform the transaction functionality via the transaction engine 124.

If the user selects a user entertainment functionality (e.g., music and/or videos, or the like), the device 100 can retrieve an entertainment file (e.g., a music file, or a video file), and play/display the entertainment file. For example, the device 100 can retrieve a song file stored in the database 140 and output the song file via the speaker 110, earbuds, headphones, and/or any other suitable output component 136. It should be also understood that the device 100 can perform the user entertainment functionality via the user entertainment engine 126.

If the user selects a user activity tracking functionality (e.g., fitness tracking, biometric tracking, or the like), the device 100 can track activity data (e.g., walking and/or running distance, walking/running steps, calories burned, heart rate, body temperature, other suitable biometric data, or the like) suing the sensors 112. It should be also understood that the device 100 can perform the user entertainment functionality via the user activity tracking engine 128.

If the user selects a voice control functionality (e.g., a voice command to instruct a virtual assistant), the device 100 can receive the voice command via the microphones 108, and instruct one or more devices (e.g., a smart phone, a virtual assistant, a smart appliance, or the like) to perform a particular task defined in the voice command. For example, the device 100 can instruct a virtual assistant to play music, turn on a smart TV, turn on a smart dish washing machine, or the like. In some examples, the device 100 can instruct smart appliances and/or smart phones directly without using the virtual assistant. Additionally, the device 100 can perform one or more functionalities based on the voice command, e.g., selecting a particular functionality. It should be also understood that the device 100 can perform the voice control functionality via the voice control engine 130.

If the user selects a user interface control functionality, the device 100 can automatically and/or manually move or change icons and/or background displayed on the user interface. For example, the device 100 can automatically and/or manually present icons associated with functionalities that are frequently used by the user, and/or automatically and/or manually remove those icons that are not frequently used. In some embodiments, the device 100 can automatically and/or manually move the icons that are more frequently used than other displayed icons to a position that the user clicked more times than other positions on the user interface based on user habit data stored in the database 140. Examples of the user interface are described above with respect to FIGS. 3 and 4. It should be also understood that the device 100 can perform the user interface control functionality via the user interface engine 132.

If the user selects a communication functionality, the device 100 can establish a communication connection with one or more computing devices (e.g., computers, laptops, mobile devices, wireless devices, Internet-connected computing devices, or any suitable electronic devices). Examples of the communication connection include making and/or receiving phone calls, exchanging messages, communications in close physical proximity, wireless communications, cellular communications, satellite communications with the one or more computing devices. In some embodiments, the device 100 can store a plurality of communication protocols to facilitate the above mentioned communications. It should be also understood that the device 100 can perform the communication functionality via the communication engine 134.

In step 506, the device 100 receives a second user input indicative of a selection of a second functionality of the group of functionalities. Examples of the functionalities are described above with respect to the step 502.

In step 508, the device 100 performs the second functionality. In some embodiments, the device 100 can perform the first and second selected functionalities concurrently. For example, the device 100 can perform the user entrainment functionality while performing the user active tracking functionality. Similarly, the device 100 can perform more than two functionalities concurrently. For example, the device 100 can perform the user entrainment functionality while performing the user active tracking functionality and the transaction functionality. In some embodiments, the device 100 can end the first functionality upon receiving the selection of the second functionality, and then perform the second functionality.

Figure 6:
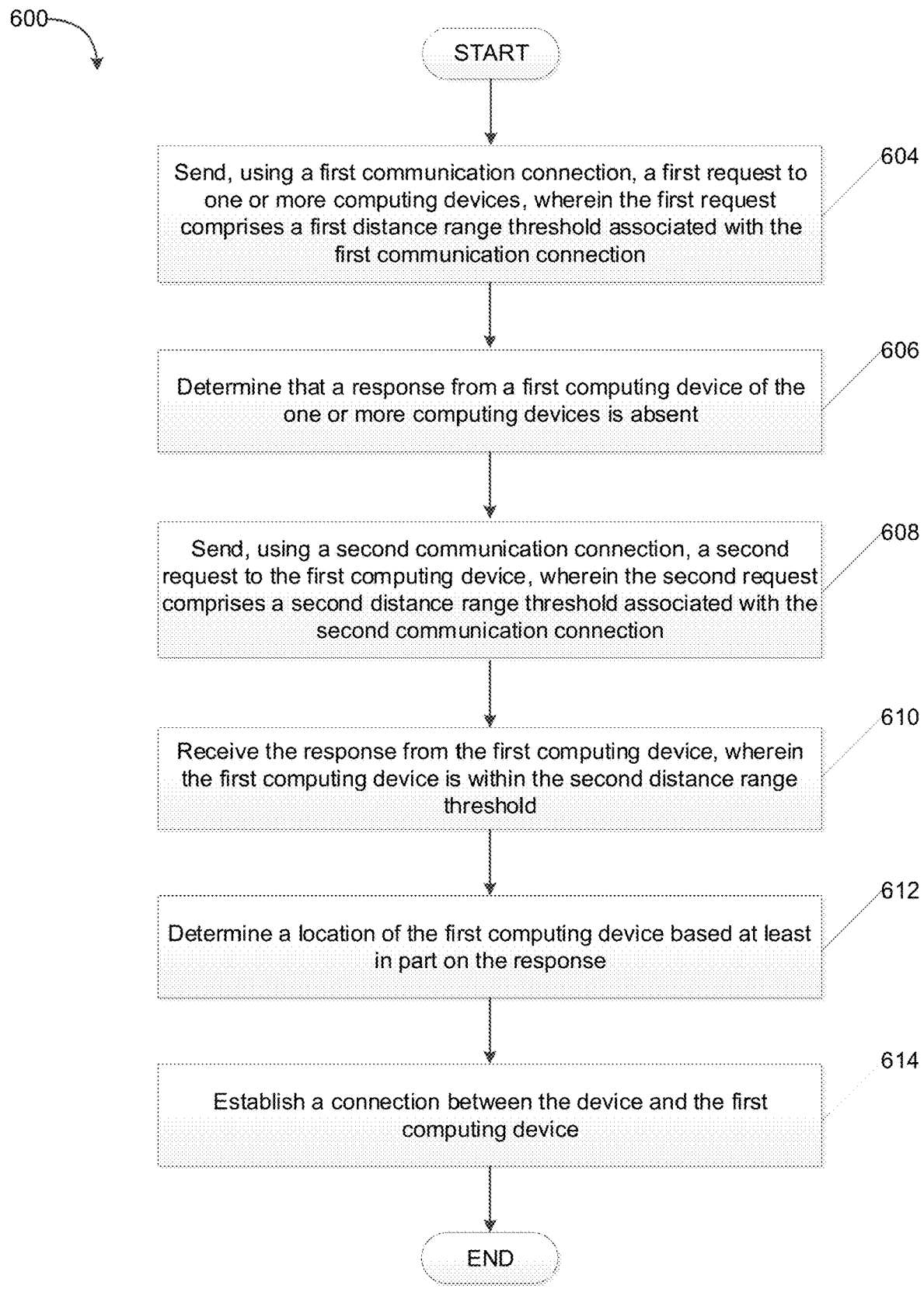
FIG. 6 is a flowchart illustrating the step of performing a device finding functionality in greater detail.

FIG. 6 is a flowchart illustrating the step of performing a device finding functionality in greater detail. It should be also understood that the device 100 can perform the step of performing a device finding functionality via the all-way-device-find engine 134.

Beginning in step 604, the device 100 sends, using a first communication connection, a first request to one or more computing devices. The first request includes a first distance range threshold associated with the first communication connection. A distance range threshold indicates a distance outside of which the computing devices will not or cannot receive/decode a request from the device 100 using a particular communication connection. Examples of communication connection includes Wi-Fi, Bluetooth, ultrasound, long-term evolution (LTE), cellular communication, GPS-based communication, satellite-based connection, communication based on radio-frequency identification (RFID), near field communication (NFC), or other suitable communication. For example, the device 100 can scan area within the first distance range threshold by sending the request to the computing devices that the user want to find via the first communication connection associated with the first distance range threshold. The first request can also include a time window and/or a bandwidth for each of the one or more computing devices to send a response.

In step 606, the device 100 can determine that a response from a first computing device of the one or more computing devices is absent. For example, if the first computing device is located outside the first distance range threshold, the device 100 does not receive a response from the first computing device during a defined time window. In some embodiments, the device 100 can determine that the signal from the first computing device does not satisfy a signal threshold. A signal threshold describes a signal value indicative of a signal from a device being acceptable by the device 100. If the signal from the first computing device does not satisfy the signal threshold (e.g., the response is too weak to be considered by the device 100), the device 100 determines that a response from the first computing device is absent. In some embodiments, if the device 100 does not receive a response from the first computing device during a waiting time period, the device 100 determines that the response is absent. A waiting time period refers to a time period that the device 100 assigns to the first computing device for responding to the request sent by the device.

In step 608, the device 100 sends, using a second communication connection, a second request to the first computing device. The second request includes a second distance range threshold associated with the second communication connection. For example, the second distance range threshold can be greater than the first distance range threshold. The second communication connection (e.g., Wi-Fi connection, cellular connection, GPS-based connection, or satellite-based connection) can be used to scan computing devices in a greater distance than the first communication connection (e.g., Bluetooth connection, RFID-communication, or NFC). The device 100 can scan area within the second distance range threshold by sending the second request to the first computing device via the second communication associated with the second distance range threshold. The second request can also include a time window and/or a bandwidth for each of the one or more computing devices to send a response.

In step 610, the device 100 receives the response from the first computing device. The first computing device is within the second distance range threshold. For example, the first computing device can send the response to the first device 100. The response can include a location indication indicative of a location of the first computing device. In some embodiments, the response can include a power level that is used to send the response.

In step 612, the device 100 determines a location of the first computing device based at least in part on the response. In some embodiments, the response includes the location of the first computing device. The device 100 can retrieve/decode the location from the response, and can use the location to further determine a distance between the first computing device and the device 100. In some embodiments, the device 100 can measure a received signal strength indication (RSSI) based on the response, and can compare the RSSI with the power level to determine the distance between the first computing device and the device 100 and the location of the first computing device. In some embodiments, the device 100 can use the RSSI to determine the distance between the first computing device and the device 100 and the location of the first computing device based on a relationship between the RSSI and distance/location (e.g., a relationship function, a look up table, or the like).

In step 614, the device 100 establishes a connection between the device 100 and the first computing device. For example, the device 100 can send instructions to instruct the first computing device to perform specific tasks (e.g., to lock, erase, or show a message, play a sound, lock the computing devices, or suitable actions for protection). In some examples, the device 100 can exchange data with the first computing device.

In some embodiments, the device 100 can display the location of the first computing device and/or the location of the device 100 on a geographical map on the user interface, and/or display a path to navigate the user from the location of the device 100 to the location of the first computing device. In some embodiments, the device 100 can track the first computing device. For example, if the first computing device moves further away to a location that is outside the second distance range threshold, the device 100 can select a third communication connection associated with a third distance range threshold that is greater than the second distance range threshold to send a third request. If the first computing device moves back to a location within the first distance range threshold, the device 100 can switch back to the first communication connection to send a third request. The device 100 can display locations of the first computing device at different time points. In some embodiments, the device 100 can track locations of multiple computing devices. Examples of the device finding functionality are further described below in FIG. 7.

Figure 7:
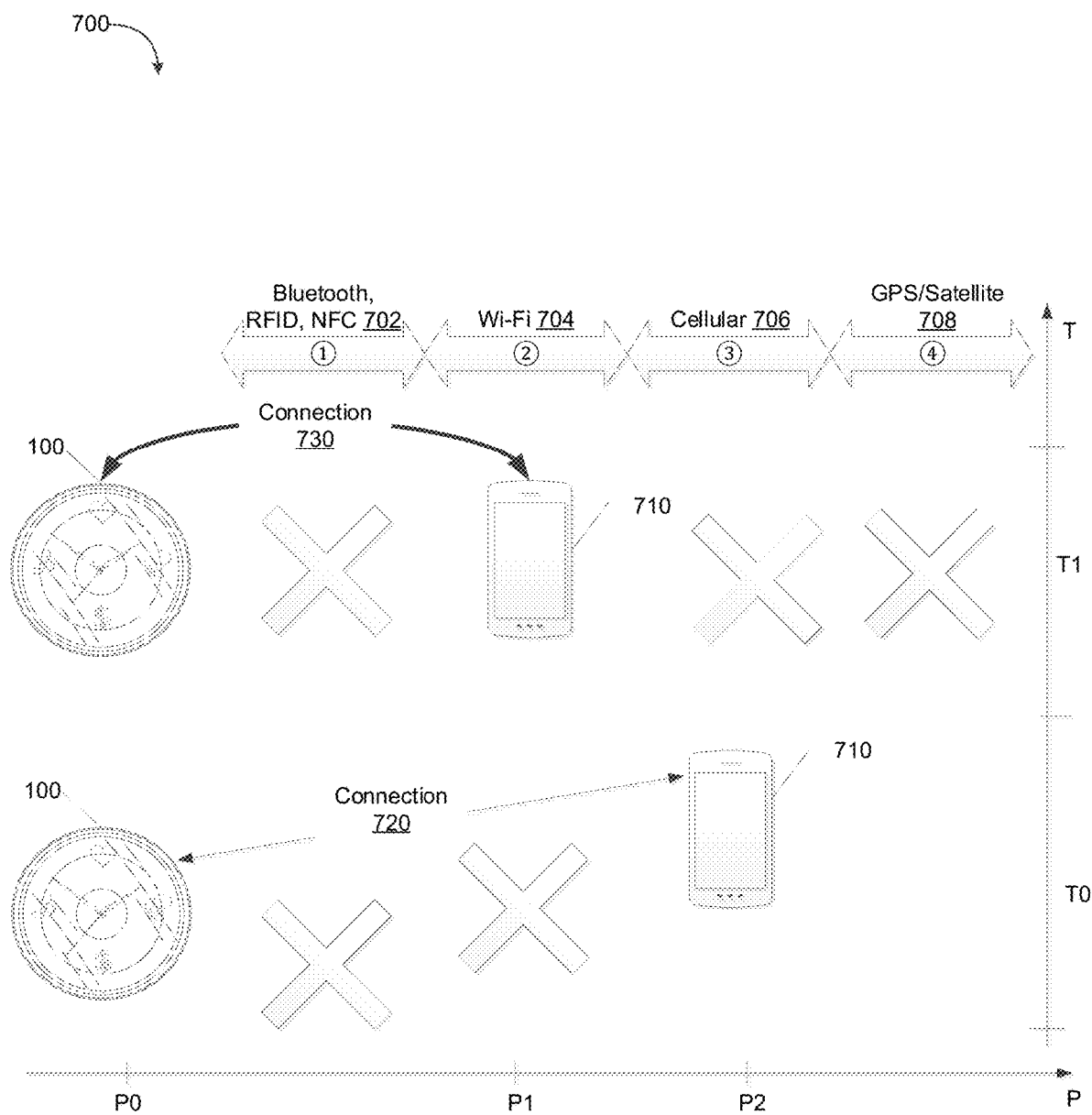
FIG. 7 is a diagram illustrating an example device finding using various communication connections of the present disclosure.

FIG. 7 is a diagram illustrating an example device finding 700 using various communication connections of the present disclosure. The device 100 can have a first communication connection 702 (e.g., Bluetooth, RFID, NFC), a second communication connection 704 (e.g., wireless communication, Wi-Fi communication), a third communication connection 706 (e.g., cellular communication), and a fourth communication connection 708 (e.g., satellite communication, GPS communication). The device 100 is located at a position P0 during a first time period T0. The device 100 can scan different areas using different communication connections sequentially or simultaneously. For example, during the first time period T0, the device 100 can send a first request using the first communication connection 702, and wait for a response from a computing device 710 to be found during a first waiting time period (e.g., less than the first time period), and can send a second request using the second first communication connection 702 during a second waiting time period (e.g., less than the first time period) if no response is received from the computing device 710 during the first waiting time period. This process can be repeated until the computing device 710 is found, or until areas are scanned using all the communication connections. As shown in FIG. 7, the device 100 does not receive responses from the computing device 710 using the first and second communication connections 702 and 704, but receives a response from the computing device 710 using the third communication connection 706, and determines that the computing device is at a positon P2 based on the response. The device 100 establishes a connection 720 between the computing device 710 and the device 100. In some examples, the device 100 can send requests using two or more communication connections simultaneously, and can receive responses simultaneously (e.g., during the same waiting time period) or during different waiting time periods. As shown in FIG. 7, the device 100 sends multiple requests using all the communication connections 702, 704, 706, and 708 simultaneously. During the same waiting time period, the device 100 does not receive responses from the computing device 710 using the first, third and fourth communication connections 702, 706, and 708, but receives a response from the computing device 710 using the second communication connection 704, and determines that the computing device is at a positon P1 based on the response. The device 100 establishes a connection 730 between the computing device 710 and the device 100. It should be understood that the sequence of the communication connections for the sequential scanning can be from the first one to the fourth one sequentially, or can be random, or can be predetermined. It should be also understood that the device 100 can send requests using two or communication connections simultaneously without using all of the communication connections.

In some embodiments, the device 100 can find multiple computing devices. For example, the device 100 can send requests to different computing devices using different communication connections sequentially or simultaneously.

During the same waiting time period or different waiting time periods, the device 100 can receive responses from each of the multiple computing device. The device 100 can determine the location of each of the multiple computing devices, and can establish communications between the device 100 and each of the multiple computing devices.

In some embodiments, the finding operation can be bidirectional. Not only the device can find a computing device (e.g., a lost device, or the like), but also the computing device can also find the device. For example, someone finds a lost device and wants to return the lost device to the owner. Based on a user input, the lost device can send a request using a communication connection defined by the lost device. The device can scan different areas using different communication connection as described above to find the request regardless of what communication connection is used by the lost device, and/or without knowing what communication connection is used by the lost device. The device can send a response to the lost device when the device finds the request, and can establish a communication connection. Examples are described in FIG. 8.

Figure 8:
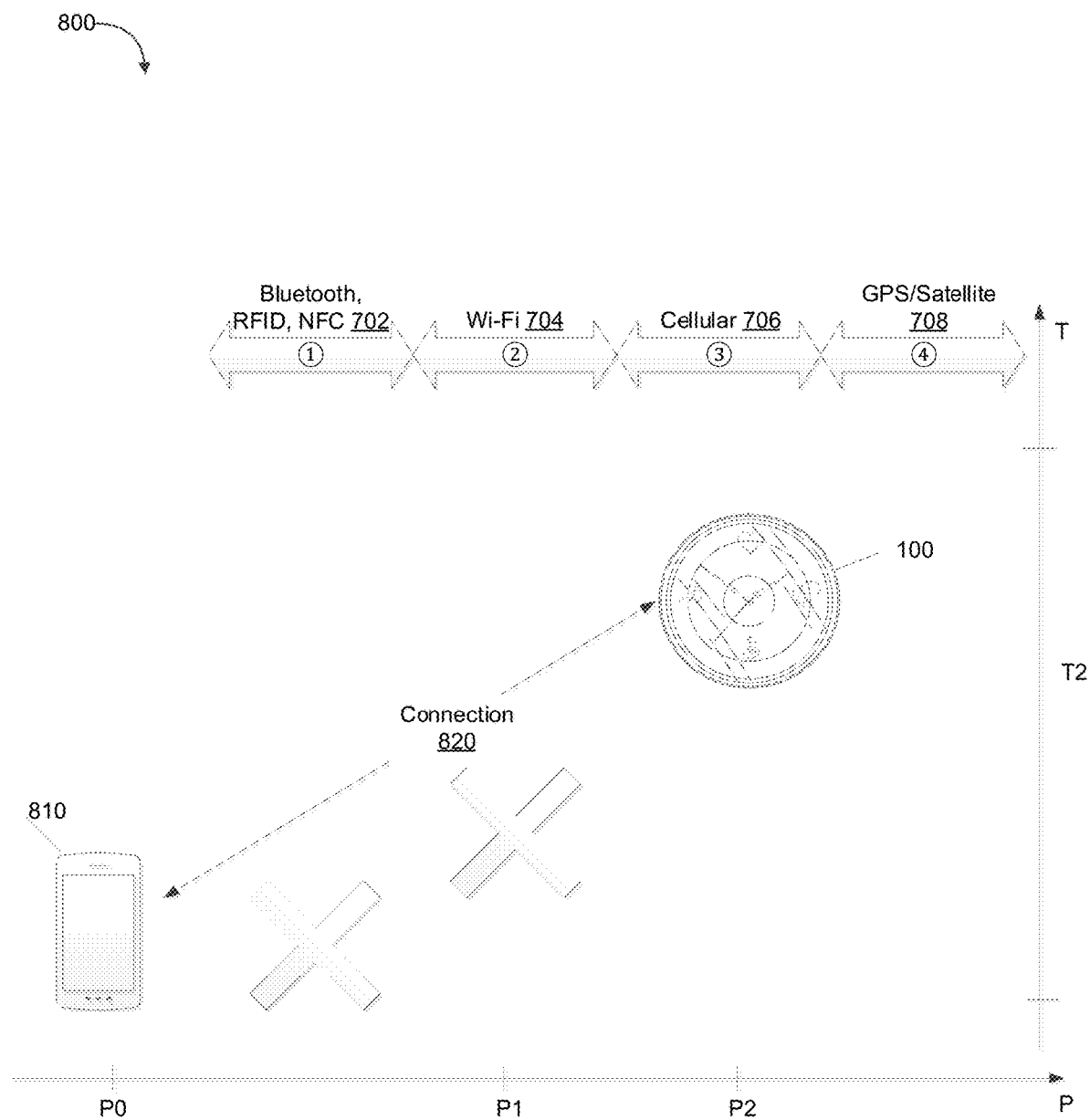
FIG. 8 is a diagram illustrating another example device finding of the present disclosure.

FIG. 8 is a diagram illustrating another example device finding 800 of the present disclosure. A computing device 810 (e.g., a lost device) at a position P0 can send a request using a communication connection defined by the computing device 810 during a time period T2. The device 100 can use the first communication connection 702 to determine whether the device 100 receives the request during a first responding time period (e.g., less than the time period T2). If the device 100 does not receive the request during the first responding time, the device 100 can use the second communication connection 704 to determine whether the device 100 receives the request during a second responding time period (e.g., less than the time period T2). This process can be repeated until the device 100 receives the request, or until areas are scanned using all the communication connections. As shown in FIG. 8, the device 100 does not receive the request from the computing device 810 using the first and second communication connections 702 and 704, but receives the request from the computing device 810 using the third communication connection 706, and determines that the computing device is at a positon P0 based on the request. The device 100 establishes a connection 820 between the computing device 810 and the device 100. It should be understood that the sequence of the communication connections for the sequential scanning can be from the first one to the fourth one sequentially, or can be random, or can be predetermined.

Figure 9:
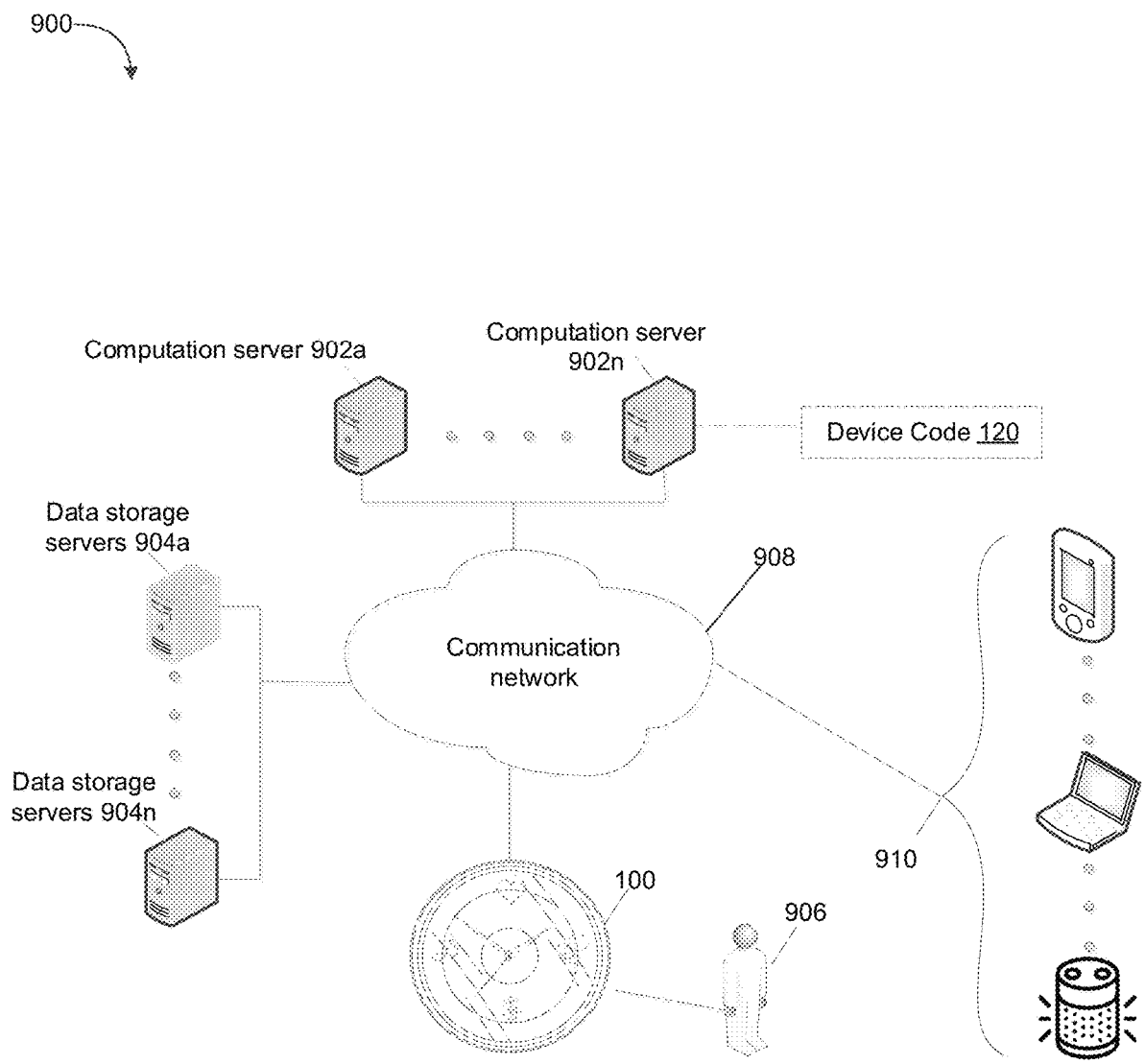
FIG. 9 is a diagram an example smart keychain system of the present disclosure.

FIG. 9 is a diagram an example smart keychain system 900 of the present disclosure. The system 900 can include a plurality of computation servers 902a-902n, a plurality of data storage servers 904a-904n, the device 100, a plurality of user devices 910, and a communication network 908. The device 100, the computation servers 902a-902n, the data storage servers 904a-904n, and the user devices 910 can communicate over a communication network 908.

The computation servers 902a-902n can communicate with the device 100 and the user devices 910 via the communication network 908. The computation servers 902a-902n can be remote cloud-based computers/servers, and/or network-based on computers/servers. In some embodiments, the computation servers 902a-902n can include the device code 120, and can include at least one processor and memory for executing the computer instructions and methods described above (which can be embodied as the device code 120). Server 830 hosts one or more applications or websites, including the device code 120 described herein, accessed by the device 100 and/or the user devices 910, and/or facilitates access to the content of the data storage servers 904a-904n.

The data storage servers 904a-904n can store and exchange data with the device 100. The data storage servers 904a-904n can also store instructions (or code) for use by the device 100, the computation servers 902a-902n, and/or the user devices 910. The data storage servers 904a-904n and computation servers 902a-902n may be located at one or more geographically distributed locations from each other or from the device 100 and/or the user devices 910.

The user devices 910 may include, but are not limited to, work stations, computers, general purpose computers, Internet appliances, hand-held devices, wireless devices, portable devices, wearable computers, cellular or mobile phones, intelligent virtual assistants (e.g., a software agent that can perform tasks or services for an individual based on commands or questions), portable digital assistants (PDAs), smart phones, tablets, ultrabooks, netbooks, laptops, desktops, multi-processor systems, microprocessor-based or programmable consumer electronics, network PCs, mini-computers, and the like.

The communication network 908 may include Bluetooth, RFID, NFC, GPS-based network, satellite-based network, an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such network.

Figure 10:
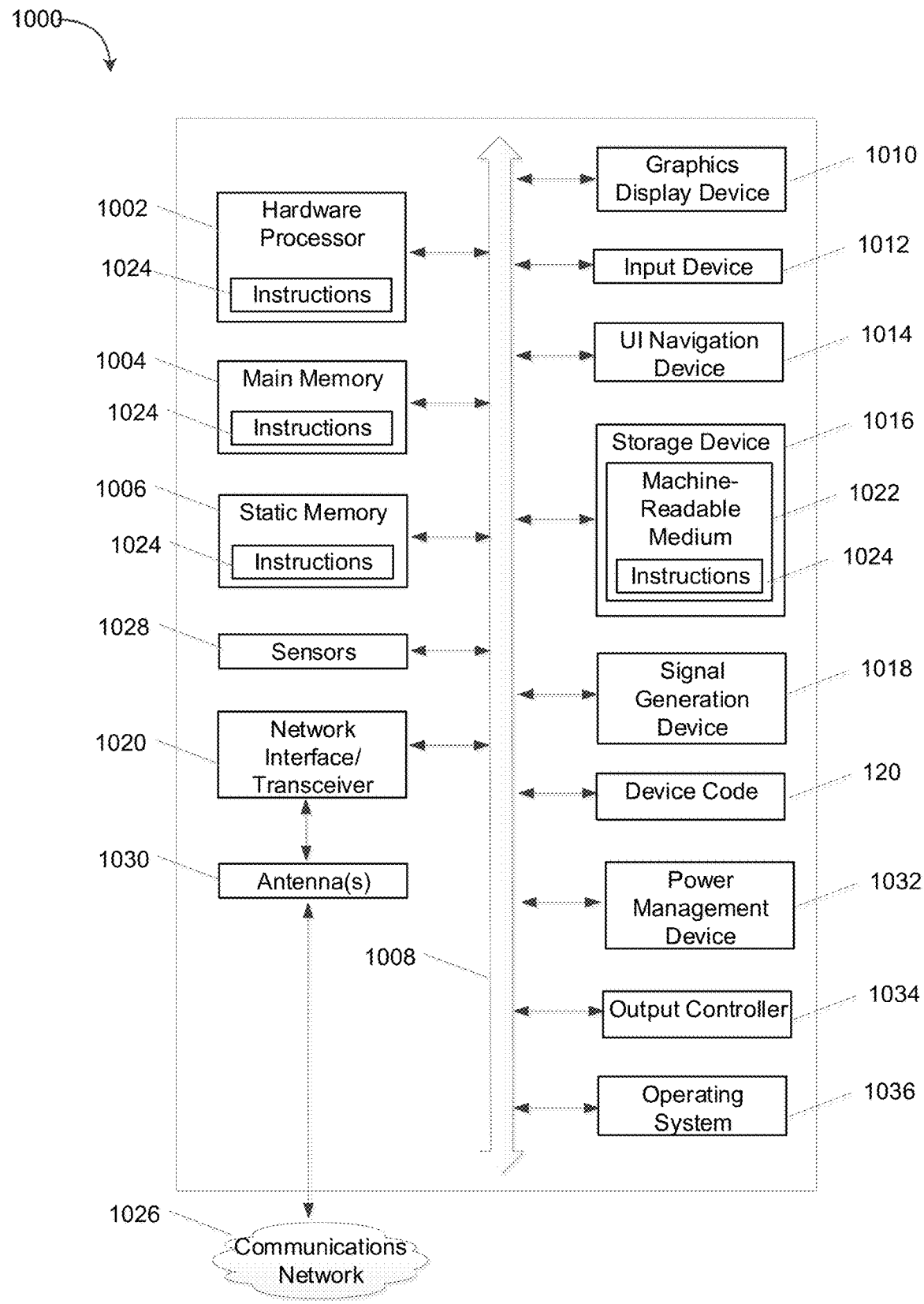
FIG. 10 is a block diagram of an example of a machine upon which any of one or more techniques (e.g., methods) may be performed of the presented disclosure.

FIG. 10 is a block diagram of an example of a machine 1000 (e.g., the device 100 of FIG. 1, the devices of FIGS. 3 and 4) upon which any of one or more techniques (e.g., methods) may be performed of the presented disclosure. In other embodiments, the machine 1000 may operate as a standalone device or may be connected (e.g., networked) to other machines. In a networked deployment, the machine 1000 may operate in the capacity of a server machine, a client machine, or both in server-client network environments. In an example, the machine 1000 may act as a peer machine in Wi-Fi direct, peer-to-peer (P2P), cellular, (or other distributed) network environments. The machine 1000 may be a server, a personal computer (PC), a smart home device, a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

The machine (e.g., computer system) 1000 may include a hardware processor 1002 (e.g., a central processing unit (CPU), a graphics processing unit (GPU), a hardware processor core, or any combination thereof), a main memory 1004 and a static memory 1006, some or all of which may communicate with each other via an interlink (e.g., bus) 1008. The machine 1000 may further include a power management device 1032, a graphics display device 1010, an alphanumeric input device 1012 (e.g., a keyboard), and a user interface (UI) navigation device 1014 (e.g., a mouse). In an example, the graphics display device 1010, alphanumeric input device 1012, and UI navigation device 1014 may be a touch screen display. The machine 1000 may additionally include a storage device (i.e., drive unit) 1016, a signal generation device 1018, a device code 120 (e.g., capable of performing steps according to the blocks of FIGS. 5 and 6), a network interface device/transceiver 1020 coupled to antenna(s) 1030, and one or more sensors 1028, such as a biometric sensor, a global positioning system (GPS) sensor, a compass, an accelerometer, or other biometric and/or motion sensor. The machine 1000 may include an output controller 1034, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)). The machine 1000 can run any operating system 1036, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. In exemplary embodiments, the operating system 916 can be run in native mode or emulated mode. In an exemplary embodiment, the operating system 916 can be run on one or more cloud machine instances.

The storage device 1016 may include a machine readable medium 1022 on which is stored one or more sets of data structures or instructions 1024 (e.g., software) embodying or utilized by any one or more of the techniques or functions described herein. The instructions 1024 may also reside, completely or at least partially, within the main memory 1004, within the static memory 1006, or within the hardware processor 1002 during execution thereof by the machine 1000. In an example, one or any combination of the hardware processor 1002, the main memory 1044, the static memory 1006, or the storage device 1016 may constitute machine-readable media.

While the machine-readable medium 1022 is illustrated as a single medium, the term "machine-readable medium" may include a single medium or multiple media (e.g., a centralized or distributed database, and/or associated caches and servers) configured to store the one or more instructions 1024.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 1000 and that cause the machine 1000 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 1024 may further be transmitted or received over a communications network 1026 using a transmission medium via the network interface device/transceiver 1020 utilizing any one of a number of transfer protocols (e.g., frame relay, internet protocol (IP), transmission control protocol (TCP), user datagram protocol (UDP), hypertext transfer protocol (HTTP), etc.). Example communications networks may include the communication network 908, a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 602.11 family of standards known as Wi-Fi®, IEEE 602.16 family of standards known as WiMax®), IEEE 602.15.4 family of standards, and peer-to-peer (P2P) networks, among others. In an example, the network interface device/transceiver 1020 may include one or more physical jacks (e.g., Ethernet, coaxial, or phone jacks) or one or more antennas to connect to the communications network 1026. In an example, the network interface device/transceiver 1020 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 1000 and includes digital or analog communications signals or other intangible media to facilitate communication of such software.

Having thus described the system and method in detail, it is to be understood that the foregoing description is not intended to limit the spirit or scope thereof. It will be understood that the embodiments of the present disclosure described herein are merely exemplary and that a person skilled in the art can make any variations and modification without departing from the spirit and scope of the disclosure. All such variations and modifications, including those discussed above, are intended to be included within the scope of the disclosure.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes multiple system elements, device components or method steps, those elements, components or steps may be replaced with a single element, component or step. Likewise, a single element, component or step may be replaced with multiple elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the present disclosure. Further still, other embodiments, functions and advantages are also within the scope of the present disclosure.

What is claimed is:

1. A smart keychain comprising:
a device body with a thickness less than about 10 millimeters (mm) and a diameter less than about 80 mm, the device body comprising:
a graphical user interface comprising an icon indicative of a functionality, wherein the graphical user interface presents content in 360 degrees regardless of how the user rotates the smart keychain; and
a processing circuitry coupled to a memory, the processing circuitry configured to:
receive a first user input indicative of a selection of the functionality;
initiate the functionality;
send, using a first communication connection of a plurality of commutation connections, a first request to a computing device, wherein the first request comprises a first distance range threshold associated with the first communication connection;
determine that a response from the computing device is absent using the first communication connection;
send, using a second communication connection of the plurality of commutation connections, a second request to the computing device, wherein the second request comprises a second distance range threshold associated with the second communication connection, wherein at least one of the first communication connection and the second communication connection comprises a Wi-Fi communication connection or a cellular communication connection;
receive the response from the computing device, wherein the computing device is within the second distance range threshold;
establish a connection between the smart keychain and the computing device; and
cause a user interface of the smart keychain to present the location of the computing device on a geographical map.

2. The smart keychain of claim 1, wherein the thickness is in a range of about 7 mm to about 10 mm, and the diameter is in a range of about 50 mm to about 72 mm.

3. The apparatus of claim 1, wherein the device body further includes a single layer system-on-chip to reduce the thickness and the weight of the device body.

4. The smart keychain of claim 1, wherein the icon has a first icon representation, wherein the processing circuitry is further configured to:
receive a user input indicative of a selection of a second icon representation for the icon; and
replace the first icon representation with the second the icon representation.

5. The smart keychain of claim 1, wherein the icon is a first icon, and the functionality is a first functionality, wherein the processing circuitry is further configured to:
receive a user input indicative of adding a second functionality to the graphical user interface;
generate a second icon indicative of the second functionality; and
replace the first icon with the second icon.

6. The smart keychain of claim 1, wherein the icon has an icon picture, wherein the processing circuitry is further configured to:
receive a user input indicative of a selection of a theme for icon pictures; and
replace the icon picture of the icon with an icon picture indicative of a theme object symbol of the theme.

7. The smart keychain of claim 1, wherein the functionality comprises a device-find functionality, a transaction functionality, a user entertainment functionality, a user activity tracking functionality, a voice control functionality, a user interface control functionality, or a communication functionality.

8. The smart keychain of claim 1, further comprising a ring and a chain, wherein the device body is connected with the ring via the chain.

9. The smart keychain of claim 1, wherein the graphical user interface comprises a touchscreen.

10. The smart keychain of claim 1, wherein the processing circuitry is further configured to:
receive a user input indicative of removing the icon from the graphical user interface; and
remove the icon from the graphical user interface.

11. The smart keychain of claim 10, wherein the processing circuitry is further configured to:
receive a user input indicative of a selection of media content as a background; and
display the media content on the graphical user interface.

12. The smart keychain of claim 1, wherein the graphical user interface comprises a plurality of icons including the icon, each icon of the plurality of icons indicative of a corresponding functionality, wherein one of the plurality of icons is located at the center of the graphical user interface and the remaining icons of the plurality of icons are evenly distributed along a circumference of the graphical user interface.

13. The smart keychain of claim 1, wherein the processing circuitry is further configured to:
send, using a third communication connection of the plurality of commutation connections, a third request to the computing device based at least in part on determining that the response is absent using the first communication connection, wherein the third request comprises a third distance range threshold associated with the third communication connection, wherein at least two of the first, second and third communication connections comprise the Wi-Fi communication connection and the cellular communication connection; and
determine that the response is absent using the third communication connection.

14. The smart keychain of claim 13, wherein the processing circuitry is further configured to:
send, using a fourth communication connection of the plurality of commutation connections, a fourth request to the computing device based at least in part on determining that the response is absent using the fourth communication connection, wherein the fourth request comprises a fourth distance range threshold associated with the third communication connection, wherein the plurality of communication connections comprise a Bluetooth communication connection, the Wi-Fi communication connection, the cellular communication connection, and the GPS-based communication connection; and determine that the response is absent using the fourth communication connection.

15. The smart keychain of claim 1, wherein determining that the response is absent using the first communication connection based at least in part on one of:

a distance between the computing device and the smart keychain is outside of the first distance range threshold;

a signal received from the computing device dissatisfies a signal threshold; and receiving no response during a waiting time period that is assigned by the smart keychain to the computing device for responding to the first request.

16. The smart keychain of claim 1, wherein the processing circuitry is further configured to determine a location of the computing device based at least in part on the response.

17. The smart keychain of claim 1, wherein the processing circuitry is further configured to instruct, based at in part on the connection, the computing device to perform one or more tasks, wherein the one or more tasks.

18. The smart keychain of claim 1, wherein the processing circuitry is further configured to:

determine whether the smart keychain receives a request from the computing device using the first communication connection;

send a response to the computing device based at least in part on determining that the smart keychain receives the request from the computing device using the first communication connection; and use the second communication connection to receive the request based at least in part on determining that the request is absent using the first communication connection.

* * * * *